United States Patent [19]

Colo et al.

[11] Patent Number: 4,867,460

[45] Date of Patent: Sep. 19, 1989

[54] HYDRAULIC JACK SEAL ASSEMBLY

[75] Inventors: Steven Colo, Princeton; Sanjivkumar K. Patel, Rahway; Melanie J. Smith, Flanders, all of N.J.

[73] Assignee: Westinghouse Electric Corp., Pittsburgh, Pa.

[21] Appl. No.: 140,171

[22] Filed: Dec. 31, 1987

[51] Int. Cl.[4] .............................................. F16J 15/18
[52] U.S. Cl. ...................................... 277/12; 277/205; 277/216
[58] Field of Search .................. 277/165, 205, 206 R, 277/216, 12, 32

[56] References Cited

U.S. PATENT DOCUMENTS

| | | | |
|---|---|---|---|
| 963,645 | 7/1910 | Pendleton | 277/216 |
| 1,690,037 | 10/1928 | Pedersen | 277/112 X |
| 2,690,939 | 10/1954 | Whaley | 277/58 X |
| 3,424,427 | 1/1969 | Ruchser | 277/216 X |
| 3,738,665 | 6/1973 | Bilco | 277/59 X |
| 4,041,845 | 8/1977 | Mean et al. | |
| 4,174,846 | 11/1979 | Scott | 277/205 |
| 4,328,972 | 5/1982 | Albertson et al. | 277/205 X |
| 4,352,499 | 10/1982 | Foster | 277/59 |
| 4,357,995 | 11/1982 | Kappenhagen | |
| 4,630,636 | 12/1986 | Cutcher | 277/205 X |

Primary Examiner—Robert S. Ward
Attorney, Agent, or Firm—D. R. Lackey

[57] ABSTRACT

A hydraulic elevator jack having a cylinder, a cylinder head, a plunger, and an improved seal assembly disposed between the cylinder head and plunger. The seal assembly includes a compartmentalized sleeve which axially separates a wear ring and a sealing function, with the wear ring being disposed closer to the cylinder, i.e., on the oil or pressure side of the cylinder head, than the sealing function. The wear ring is discontinuous, having at least first and second spaced ends, providing improved distribution of load on the wear ring while reducing drag and tendency of the wear ring to bind. The sealing function includes at least one O-ring energizing seal having a main body portion, and a discontinuous, elastomeric, solid body O-ring disposed in a cavity defined by the body portion. The O-ring is preferably centered relative to the axial dimension of a sealing surface of the main body portion.

14 Claims, 4 Drawing Sheets

HYDRAULIC JACK SEAL ASSEMBLY

TECHNICAL FIELD

The invention relates in general to hydraulic jacks, and more specifically to hydraulic jacks suitable for use in hydraulic elevators.

BACKGROUND ART

U.S. Pat. No. 4,041,845, which is assigned to the same assignee as the present application, discloses a hydraulic elevator jack which includes a travel limit structure for the plunger which generates a hydraulic retarding force programmed by a resilient device during a travel limit stop. While this hydraulic jack performs well, it would be desirable, and it is the object of this invention, to significantly reduce the vibration and jerk rate associated with hydraulic elevator jacks, to improve not only the hydraulic elevator jack disclosed in the hereinbefore mentioned U.S. patent, but hydraulic elevator jacks in general.

DISCLOSURE OF THE INVENTION

Briefly, the present invention is a new and improved hydraulic elevator jack having a cylinder, cylinder head, and plunger. The hydraulic elevator jack of the invention includes a seal assembly which substantially reduces radial forces on the plunger in the cylinder head, and thus the friction, reducing jerk and vibration to improve ride quality in the associated elevator cab. The improved ride quality is achieved while reducing wear of the guiding components in the cylinder head, and without significantly affecting the manufacturing cost of the jack.

More specifically, the seal assembly includes a sleeve, at least one seal, and a wear ring. The sleeve is compartmentalized, with a separate axially spaced compartment for each seal and for the wear ring. This prevents stack-up of the wear ring and seal, or seals, and the resulting distortion, significantly contributing to lower vibration and jerk rate, while improving reliability and service life of the seals and wear ring.

The wear ring is placed in the sleeve compartment closest to the pressure or oil supply side of the cylinder head. Thus, unlike prior art structures, the oil film on the plunger is not removed by a seal before the oil film reaches the wear ring. This contributes to lower friction between the wear ring and plunger, and longer wear life of the wear ring.

The wear ring is a high pressure molded laminate of phenolic, cotton duck, and a lubricant, which in a preferred embodiment is molybdenum disulfide. The inner surface of the wear ring is precision machined after molding, to insure proper fit and uniform radial loading on the plunger.

To prevent binding, vibration and increased jerk at high oil temperatures, the wear ring is not utilized as a complete ring as in the prior art. The present invention provides a single cut through the body of the wear ring to provide first and second ends which are spaced by a dimension which enables unrestrained thermal expansion of the wear ring. The lubricant, the machined surface and the spaced ends of the cut wear ring all contribute significantly to lower friction, lower jerk, and increased life of the wear ring.

One or two seals may be used, with a second seal, when used, being a back-up seal to a first or main seal. When two seals are used they may be of different materials and configurations, or they may be of like construction, as desired. The components and materials of a seal are selected to reduce radial loading on the plunger without deleteriously affecting the sealing function Instead of using a cotton fabric reinforced neoprene rubber, common in prior art seals, the seal body is formed of a material which has the characteristic of providing an excellent seal with the steel plunger without high radial loading. Polyurethane and polytetrafluoroethylene (Teflon) are preferred examples. The seal body has an aperture at one axial end for receiving a solid rubber O-ring, which energizes the seal. Prior art metallic springs are not utilized as the energizing element as they relax during use, requiring frequent replacement. Prior art pin hole O-rings are not utilized as the energizing element as they may collapse over time and provide a non-uniform radial loading on the plunger. The rubber O-ring, in addition to having a solid body, is not utilized as a complete ring but has a single cut to provide first and second slightly spaced ends. The cut in the O-ring assures uniform radial sealing forces while preventing high radial forces which increase friction, wear, and jerk rate.

While not essential to the invention, when the seal body is not formed of polytetrafluoroethylene, a thin, solid, continuous bearing ring or heel bearing may be disposed axially adjacent to the seal-plunger interface, within the bore of the seal. This bearing ring is constructed of a material which exhibits substantially the same static and dynamic coefficients of friction relative to the steel plunger, such as polytetrafluoroethylene.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 1A is an enlarged fragmentary view of FIG. 1, illustrating a modification of the invention which may be used;

DESCRIPTION OF PREFERRED EMBODIMENTS

Figure 1:
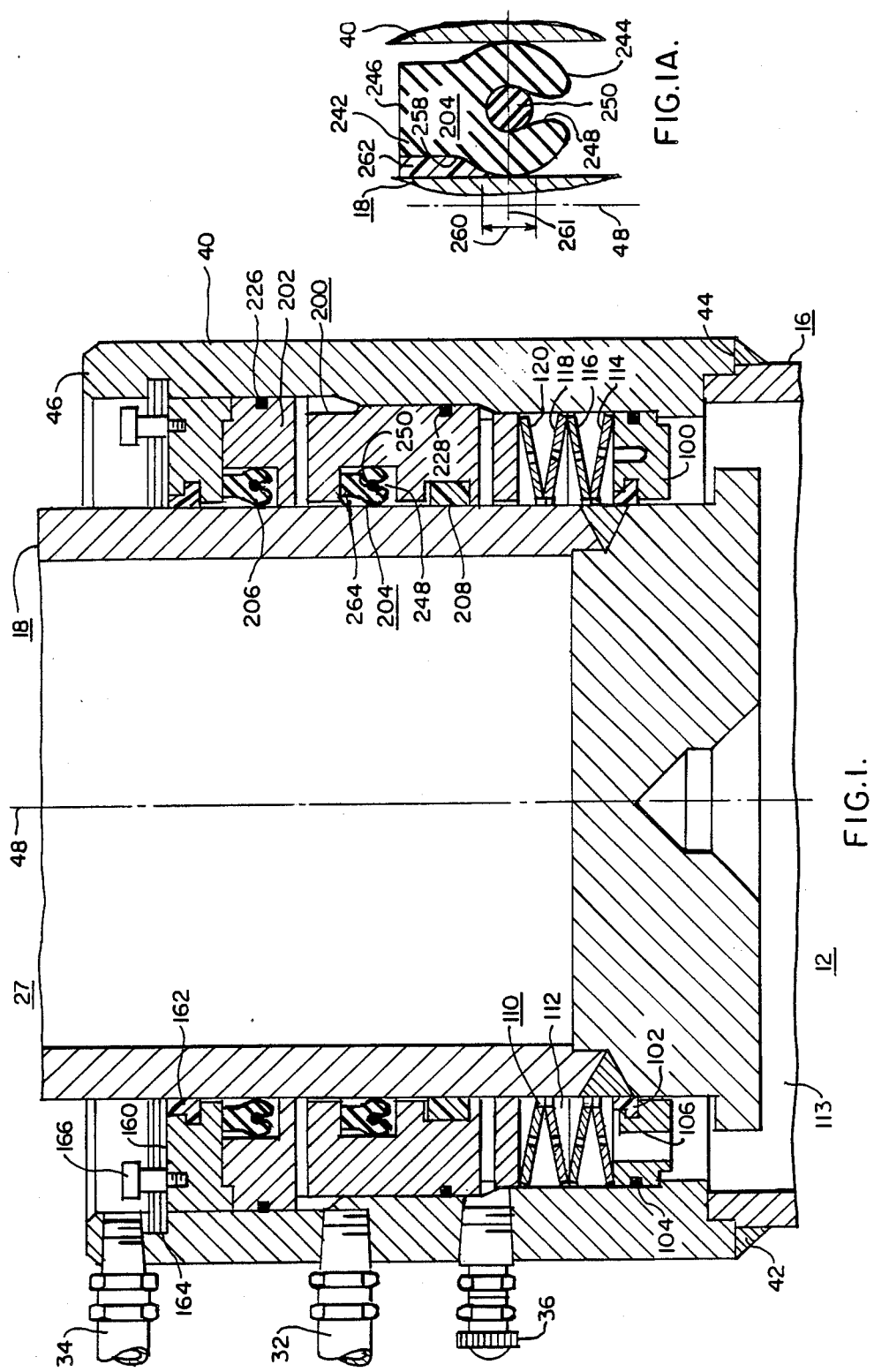
FIG. 1 is a cross sectional view through a cylinder head of a hydraulic elevator jack constructed according to the teachings of the invention.

FIG. 1 is a cross sectional view of a hydraulic elevator jack assembly 12 constructed according to a first embodiment of the invention. Jack assembly 12 includes a cylinder 16, a plunger 18, and a cylinder head 2. FIG. 1 is similar to FIG. 2 of the hereinbefore mentioned U.S. Pat. No. 4,041,845, except for modifications according to the teachings of the invention, and this patent is hereby incorporated into the specification of the present application by reference. Like reference numerals are used for like and unmodified components for ease in referring to the incorporated patent.

Cylinder head 27 includes a scavenger line 32, which returns fluid leakage to a power unit (not shown), an excess fluid gravity drain line 34, and an air purge valve 36. Cylinder head 27 also includes a cylinder head housing 40 having first and second axial ends 44 and 46, respectively, relative to a longitudinal axis 48 of cylinder 16 and plunger 18. The first axial end 44 is attached to the upper end of cylinder 16, such as by weld 42. The first axial end 44 is also called the pressure end or "side" of the cylinder head 27, as it is the end closest to the source of the high pressure oil which operates the jack assembly 12.

Proceeding from the first axial end 44 of housing 40 towards the second axial end 46, the components of cylinder head 27 include a metallic cylinder ring 100 having a wiper seal 102 disposed in contact with plunger 18 and an O-ring seal 104 disposed in contact with the inner surface of housing 40. Cylinder ring 100 includes a plurality of circumferentially spaced openings or shock absorber orifices 106 disposed between the axial ends of ring 100.

Resilient means 110 is disposed above cylinder ring 100 to provide a mechanically resilient cushion or retarding force, and also to define a cavity or auxiliary fluid chamber 112 which is in fluid communication with the main fluid chamber 113 in the cylinder 16 via the shock absorber orifices 106. The resilient means 110, for example, may be in the form of a plurality of Belleville springs 114, 116, 118 and 120, but elastomeric means may be used, as desired.

A seal assembly 200 constructed according to the teachings of a first embodiment of the invention is disposed above resilient means 110, and an upper cylinder ring 160 is placed over the seal assembly 200. Cylinder ring 160 includes a wiper seal 162 similar to seal 102 in the lower cylinder ring 100. Cylinder ring 160 may be held in position by any suitable means, such as by a snap ring 164 and a plurality of screws 166.

Figure 2:
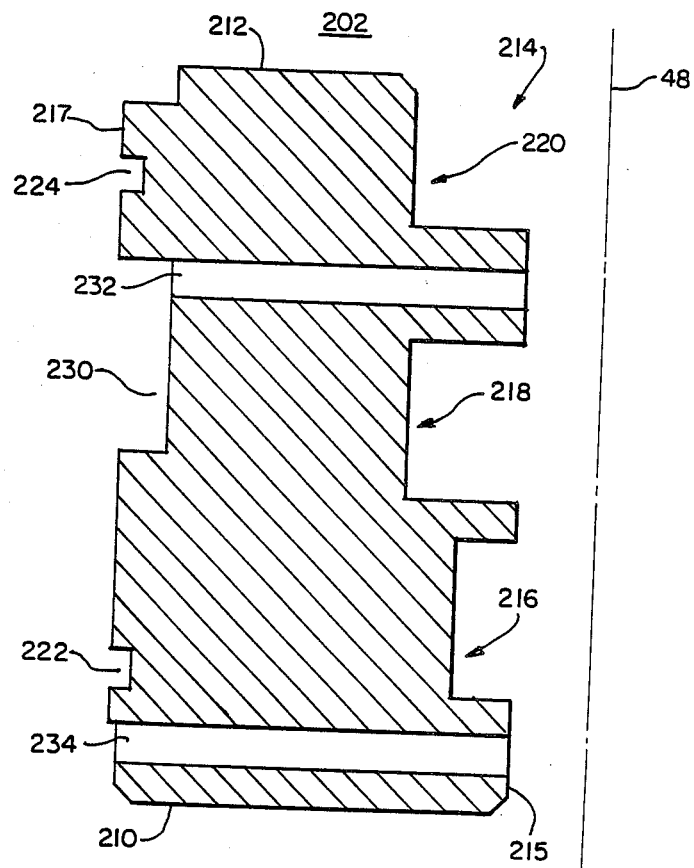
FIG. 2 is an enlarged cross sectional view of a sleeve which is part of a seal assembly shown in FIG. 1.

Seal assembly 200 includes a seal housing or sleeve 202, first and second seals 204 and 206, respectively, and a wear ring 208. Sleeve 202, which is shown in an enlarged cross sectional view in FIG. 2, is a metallic tubular member, such as steel, having first and second axial ends 210 and 212, respectively, and an opening 214 which extends between its axial ends defined by an inside diameter (I.D.) 215, and an outside diameter (O.D) 217. The inside diameter 215 of sleeve 202, unlike prior art sleeve structures, is stepped to define first, second and third compartments 216, 218 and 220, respectively, which are axially spaced in the recited order from the first end 210 to the second end 212. Compartments 216, 218 and 220 respectively receive wear ring 208, and the first and second seals 204 and 206. The first seal 204 is the main seal, and the second seal 206 is a back-up seal whose main function is to prevent oil leakage in the event the main seal loses its effectiveness.

In the prior art it is common to provide a single compartment for the seals and wear ring, with the wear ring being placed between the main and back-up seals. Thus, when two seals are used the wear ring is used to, in effect, define compartments for the two seals. This has a disadvantage in that the seals and wear ring stack up and become distorted, contributing to higher friction, higher jerk rates, greater vibration, and increased wear of the seals and wear ring. This has a further disadvantage in that the lower seal wipes the oil film from the plunger 18 before the oil film reaches the wear ring. Thus, there is a higher friction between the wear ring and the plunger with such prior art arrangements, and a higher rate of wear. In the disclosed arrangement, the oil film is still on plunger 18 when the wear ring 208 is encountered, reducing friction and wear.

The O.D. 217 of sleeve 202 includes circumferential grooves 222 and 224 for receiving O-ring seals 226 and 228, respectively. O.D. 217 also includes a compartment 230 which forms an oil reservoir in communication with scavenger line 32. Circumferentially spaced openings, such as opening 232, direct oil from the I.D. 215 to the O.D. 217 and thus to oil reservoir 230. Additional circumferentially spaced openings, such as opening 234, collect air for purging via the purge valve 36.

The compartmentalized sleeve 202 makes it unnecessary for the wear ring to be disposed between the seals. According to the teachings of the invention, the wear ring is more advantageously placed on the pressure side of the sealing function where it receives lubrication in the form of the thin oil film on the plunger, before the oil film is removed by the sealing function. Thus, friction and the resulting wear of the plunger and wear ring are reduced. Wear ring 208, which is shown in an enlarged perspective view in FIG. 3, has also been constructed according to the teachings of the invention to reduce radial loading on the plunger, and to accommodate high oil temperatures without deleterious expansion. In the prior art it is common to form the wear ring of a transfer molded phenolic resin which is usually reinforced to provide the requisite mechanical properties. Such a construction provides a relatively high coefficient of friction, and the resulting wear ring may suffer from molding artifacts or residual stresses. The artifacts or stresses may cause cold flow and result in uneven loading on the wear ring surface and/or pinching of the plunger 18. Either of these undesirable occurrences may lead to premature failure of the wear ring and seals, and while this is occurring the ride quality in the elevator cab would be compromised.

Wear ring 208 in the present invention is precision machined from fully cured tubing formed by high pressure molding a laminate of phenolic resin and cotton duck. The laminate is impregnated with a lubricant during the high pressure molding process. In a preferred embodiment of the invention, the lubricant is molybdenum disulfide. The lubricant increases the mechanical strength of wear ring 208, and it lowers its coefficient of friction. Machining after molding insures the correct fit of the wear ring 208 relative to the mating surface of plunger 18, contributing to a more uniform loading of I.D. 234, which is the wear ring contact surface.

Figure 3:
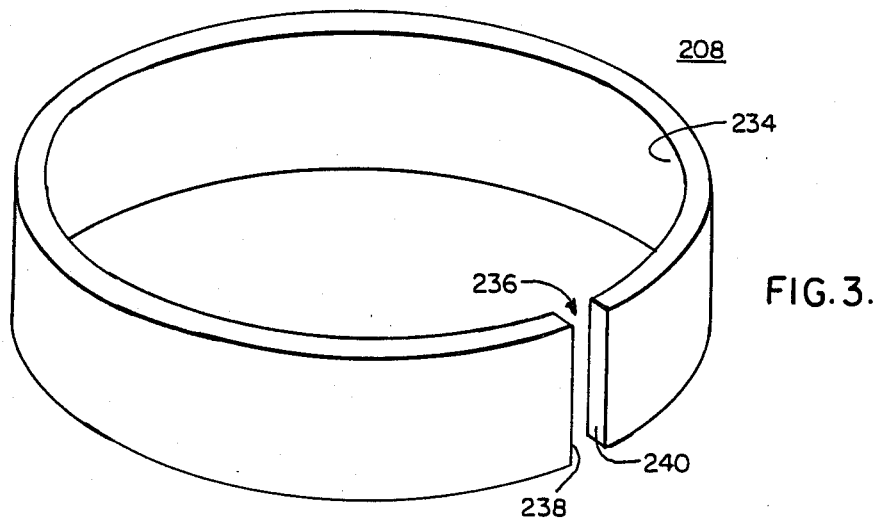
FIG. 3 is a perspective view of a wear ring which is part of the seal assembly shown in FIG. 1.

In the prior art the wear ring is a solid circular ring. This provides less flexibility over dimensional control as well as promoting interference with plunger 18 due to constrained thermal expansion. As illustrated in FIG. 3, wear ring 208 is discontinuous, having a cut indicated at 236 which results in first and second spaced, aligned ends 238 and 240. The discontinuous wear ring 208, in conjunction with the new material and processing method, provides better dimensional control Also, since thermal expansion is accommodated in the spacing between ends 238 and 240, pinching and jamming of plunger 18 due to thermal expansion of the wear ring 208 is eliminated.

Figure 4:
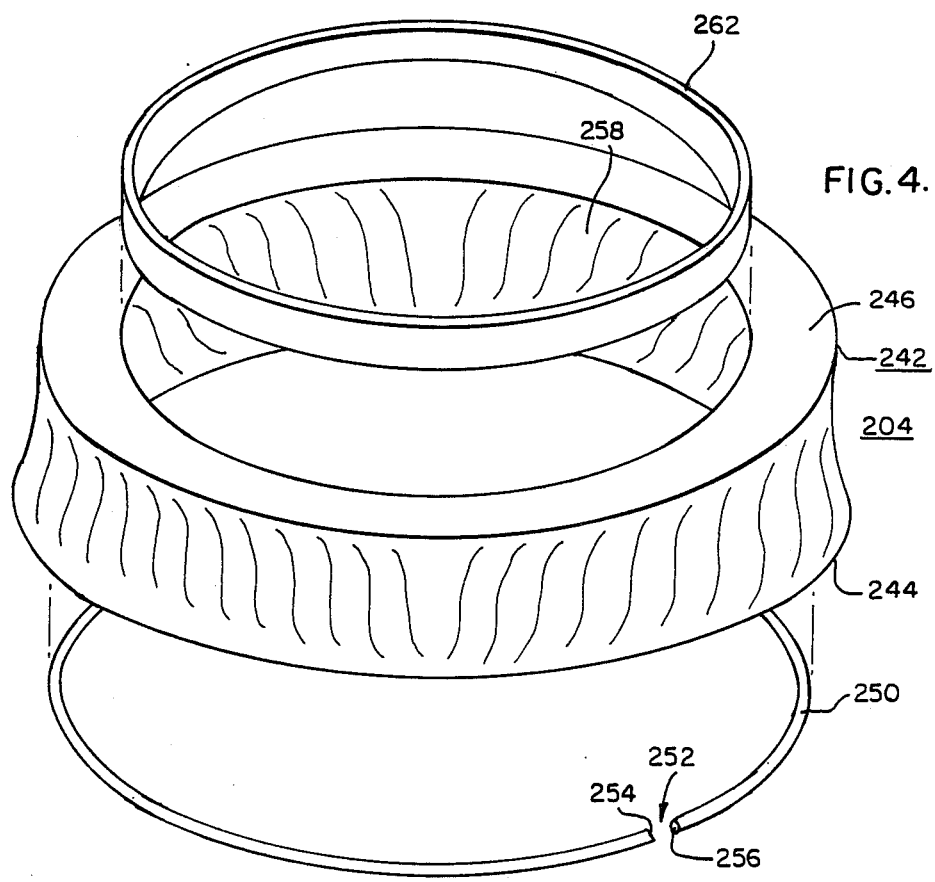
FIG. 4 is an exploded perspective view of a seal which is part of the seal assembly shown in FIG. 1.

FIG. 1 illustrates a first embodiment of main seal 204, and the enlarged fragmentary view of FIG. 1 set forth in FIG. 1A illustrates a modified form of seal 204 in which an annular sleeve type or heel bearing 262 is added to the seal assembly 200. FIG. 4 is an exploded perspective view of seal 204, with FIG. 4 also illustrating the optional bearing 262.

Instead of forming seal 204 of cotton fabric reinforced neoprene rubber, as is common with prior art seals, seal 204 is constructed of different materials, each selected for a particularly desirable property. The prior art seals have substantially different coefficients of static and sliding friction on steel, and these coefficients are significantly higher than the coefficients of the new design. More specifically, seal 204, in both embodiments, includes a circular body portion 242 formed either of polyurethane or polytetrafluoroethylene. Polyurethane has desirable characteristics, such as being both pliable and wear resistant, and is the first choice in providing the actual sealing surface with the steel plunger 18, because it provides optimum sealing without the use of high radial forces. Polytetrafluoroethylene also has desirable characteristics, including its very low friction on steel, and the fact that it has substantially the same coefficients of static and dynamic friction on steel.

Body portion 242 has first and second axial ends 244 and 246, respectively, with the first axial end defining an open ended, axially extending cavity 248 for receiving an O-ring 250. O-ring 250, which actuates the sealing function, is preferably formed of an elastomeric material, such as rubber, or equivalent, because of the excellent resiliency of rubber and because rubber provides uniform radial loading independent of system pressure. This is in contrast to prior art metallic springs used to actuate seals. Metallic springs relax over time, requiring frequent replacement. O-ring 250 is not a complete ring but is discontinuous, having a cut at 252 which forms first and second spaced, aligned ends 254 and 256. Uniform actuation of the sealing function occurs by utilizing a cut O-ring, without resorting to high radial forces, as the spaced ends accommodate dimensional differences, and dimensional changes during usage. It is also important to note that O-ring 250 has a solid cross section, as opposed to a pin hole O-ring. Hollow O-rings are undesirable as they may collapse and create nonuniform radial loading of the sealing function.

As shown most clearly in FIG. 1A body portion 242 has an inner surface 258 formed by first and second different inner diameters. The first inner diameter defines a first portion of inner surface 258, indicated by double headed arrow 260, which portion forms a seal with plunger 18. In a preferred embodiment of the invention, a plane 261 transverse to the longitudinal axis 48 which bisects the sealing surface indicated by arrow 260 should pass through the center of O-ring 250. This arrangement provides an optimum seal with minimal radial force.

The structure of seal 204 described to this point provides a significant advantage over prior art seals. When body portion 242 is formed of polyurethane, seal assembly 204 may be augmented by providing a sleeve or bearing 262 within a cavity 264, shown in FIG. 1, which cavity is formed between the inner surface 258 of seal body 242 and plunger 18 by the second inner diameter, which is larger than the first inner diameter Cavity 264 is axially adjacent to the seal surface indicted by arrow 260. Bearing 262 is formed of a material which has substantially the same coefficients of static and sliding friction on steel, such as polytetrafluoroethylene. Bearing 262 thus aids in guiding and supporting plunger 18 while adding a material to the seal assembly 200 which has the desirable characteristic of having substantially the same coefficient of static friction as its coefficient of sliding friction, assuring smooth starts.

Back-up seal 206 may have a configuration similar to the main seal 204, and it may be constructed of the same materials. On the other hand, it may have a different configuration and/or it may be constructed of different materials than the main seal 204. For example, both seals 204 and 206 may have a body portion 242 formed of polyurethane, they both may have a body portion 242 formed of polytetrafluoroethylene, or one may be constructed of polyurethane and the other of polytetrafluoroethylene. Regardless of the configuration or material of the body portion 242, both seals are preferably O-ring energized, both utilizing a solid cross section, elastomeric material, and both being discontinuous, i.e., having two spaced ends, as hereinbefore described relative to the main seal 204.

Figure 5:
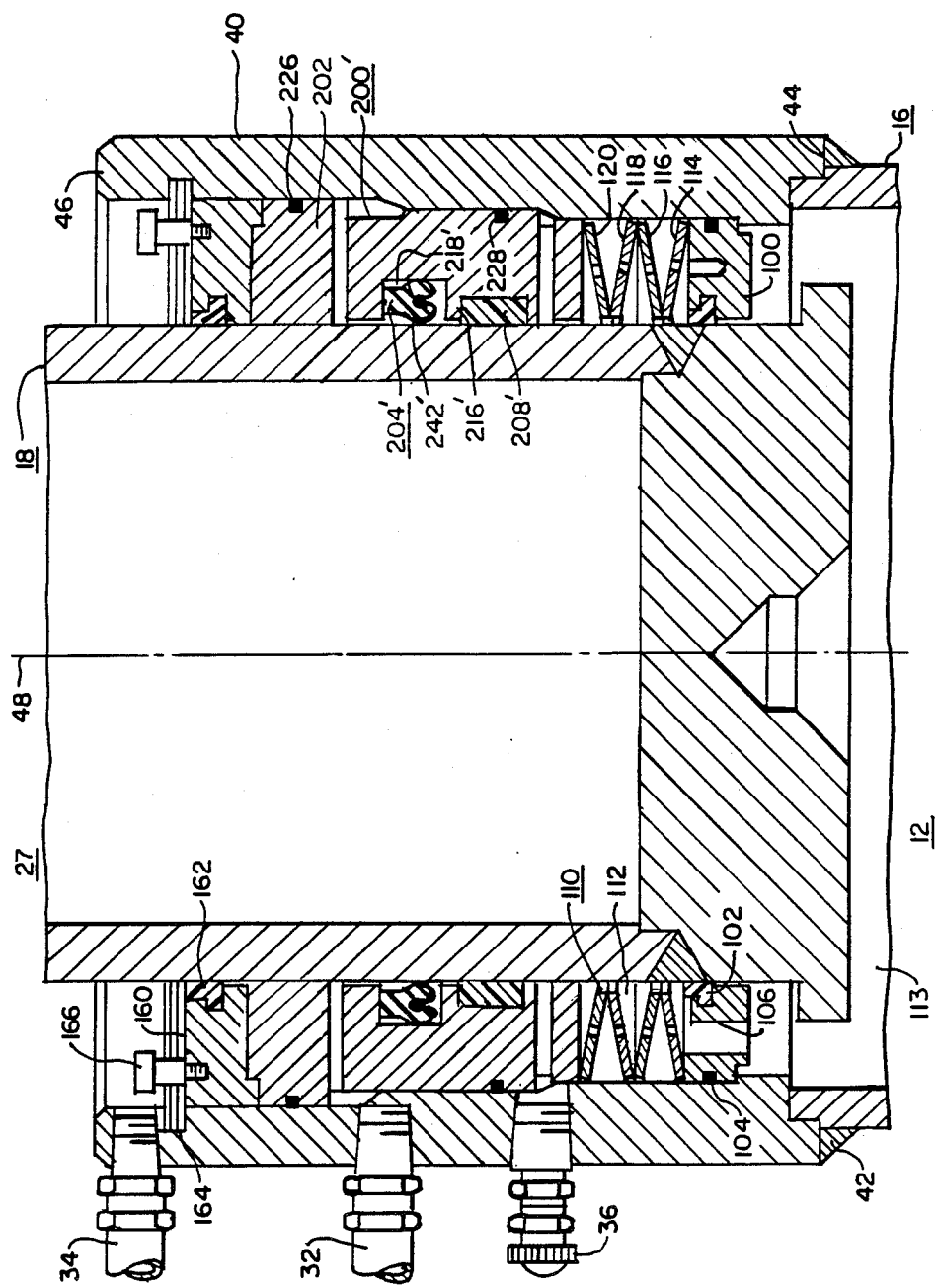
FIG. 5 is a view of a cylinder head similar to FIG. 1, except illustrating a single-seal embodiment of the invention.

FIG. 5 is a cross sectional view of a hydraulic elevator jack assembly 12' which is similar to assembly 12 shown in FIG. 1, except illustrating another embodiment of seal assembly 200. Seal assembly 200 will be referred to with a prime mark in FIG. 5 to indicate a modification thereof. Components in FIG. 5 which may be the same as those in FIG. 1 are given like reference numerals, and will not be described again.

Back-up seal 206 in the FIG. 1 embodiment is commonly used in the prior art because the useful service life of the main seal has not been consistent for the reasons hereinbefore set forth. Tests on the new construction of the main seal 204 set forth herein indicate a more consistent wear life, as well as a greatly extended wear life, e.g., 3 to 4 times the wear life of prior art seals we have been using. This experience indicates that a single seal constructed as hereinbefore set forth is sufficient, eliminating the need for a back-up seal. FIG. 5 sets forth a single seal embodiment of the invention.

More specifically, seal assembly 200' has a modified sleeve 202' having first and second axially separated compartments 216' and 218', respectively, defined by the internal diameter of sleeve 202', instead of three as in the FIG. 1 embodiment. Wear ring 208' may have the same construction as wear ring 208, except its axial dimension may be increased over that of wear ring 208, to provide additional lateral support for plunger 18. Seal 204' has the same construction as hereinbefore described relative to seal 204. If body portion 242' is formed of polyurethane, it may include heel bearing 262 shown in FIG. 4.

In summary, there has been disclosed a new and improved hydraulic elevator jack, with several complementary aspects of the sealing function being improved which cooperate to cumulatively reduce friction and binding, resulting in lower jerk rates and a significantly improved ride in the associated elevator cab. A compartmentalized seal body prevents stack up of the sealing and wear ring elements, and the resultant deformation and binding caused thereby. This enables the wear ring to be placed on the pressure side of the cylinder head, between the source of the high pressure oil and the sealing function, assuring an oil film between the wear ring and the plunger. The wear ring includes a cut which spaces the cut ends to accommodate temperature induced dimensional changes without binding. The seals are improved by forming the seal body of polyurethane or polytetrafluoroethylene, and energizing the seals by solid body, elastomeric O-rings. The O-rings are also discontinuous, i.e., cut to provide spaced ends, which provides uniform but relatively low radial forces on the plunger. If required, the sealing function may be augmented when polyurethane is used for the main body portion, by adding annular bearings adjacent to the sealing surfaces formed of a material which exhibits substantially the same coefficients of static and dynamic friction relative to steel.

We claim as our invention:

1. In a hydraulic elevator jack having a longitudinal axis, a cylinder, a cylinder head having a pressure side, and a fluid actuated plunger mounted for axial movement within the cylinder and cylinder head, the improvement comprising:

a seal assembly disposed between said cylinder head and said plunger, said seal assembly including a compartmentalized sleeve, sealing means disposed between said sleeve and said plunger, and a wear ring, with said compartmentalized sleeve physically separating said sealing means and said wear ring, and with said wear ring being disposed closer to the pressure side of the cylinder head than said sealing means, said sealing means including a seal body portion having first and second axial ends, with the first axial end being closer to the pressure side of the cylinder head than the second axial end, and with said first axial end defining an axially extending cavity, and including a discontinuous seal energizing O-ring in said cavity, with said discontinuous O-ring being formed of an elastomeric material having a solid cross section.

2. The hydraulic elevator jack of claim 1 wherein the compartmentalized sleeve defines at least first and second compartments, and the sealing means includes first and second seals respectively disposed in said first and second compartments, with the wear ring and said first and second seals being axially spaced in the cylinder head by the compartmentalized sleeve, in the recited order, starting from the pressure side of the cylinder head.

3. The hydraulic elevator jack of claim 1 wherein the sealing means includes a seal body portion having first and second axial ends, a first inner diameter adjacent to the first axial and selected to cause the first inner diameter to slide on the plunger surface, and a second inner diameter adjacent to the second axial end which is larger than the first inner diameter to define a space between each seal and the plunger, and including bearing means disposed in said space.

4. The hydraulic elevator jack of claim 3 wherein the bearing means is constructed of a material which exhibits substantially the same static and dynamic coefficients of friction relative to the plunger.

5. The hydraulic elevator jack of claim 1 wherein the wear ring is discontinuous, having first and second aligned ends, and is formed of a non-metallic material, and the plunger and the compartmentalized sleeve cooperatively define at least first and second axially spaced compartments in which the non-metallic wear ring and sealing means are respectively disposed.

6. The hydraulic elevator jack of claim 1 wherein the wear ring is formed of a non-metallic material which is impregnated with a lubricant.

7. The hydraulic elevator jack of claim 6 wherein the lubricant is molybdenum disulfide.

8. The hydraulic elevator jack of claim 6 wherein the non-metallic wear ring has a machined inner surface facing the plunger, to facilitate accurate match with the surface and diameter of the plunger, as well as uniform loading of the wear ring-plunger interface.

9. The hydraulic elevator jack of claim 1 wherein the seal body portion includes a first inner diameter adjacent to the first axial end selected to define a first inner surface which slides on the plunger, and wherein a plane transverse to the longitudinal axis of the hydraulic jack which bisects the O-ring also bisects the first inner surface.

10. The hydraulic elevator jack of claim 1 wherein the sealing means includes a single seal between the sleeve and the plunger, with the wear ring and single seal being axially spaced in the cylinder head by the sleeve, in the recited order, starting from the pressure side of the cylinder head.

11. The hydraulic elevator jack of claim 1 wherein the sealing means includes a seal body portion formed of polyurethane.

12. The hydraulic elevator jack of claim 1 wherein the sealing means includes a seal body formed of polytetrafluoroethylene.

13. The hydraulic elevator jack of claim 1, wherein the wear ring is discontinuous, having first and second spaced ends, enabling the wear ring to accommodate inaccuracies in plunger surface and diameter.

14. In a hydraulic elevator jack having a longitudinal axis, a cylinder, a cylinder head having a pressure side, and a fluid actuated plunger mounted for axial movement within the cylinder and cylinder head, the improvement comprising:

a seal assembly disposed between said cylinder head and said plunger, said seal assembly including a compartmentalized sleeve, sealing means disposed between said sleeve and said plunger, and a discontinuous wear ring disposed between said sleeve and said plunger, said sleeve physically separating said sealing means and said wear ring, locating said wear ring closer to the pressure side of the cylinder head then said sealing means, said sealing means including an O-ring energizing seal, with said seal including a body portion forming a seal interface with the plunger, and a discontinuous O-ring in said body portion, said O-ring being formed of an elastomeric material having a solid cross section.

* * * * *